Figure 1:
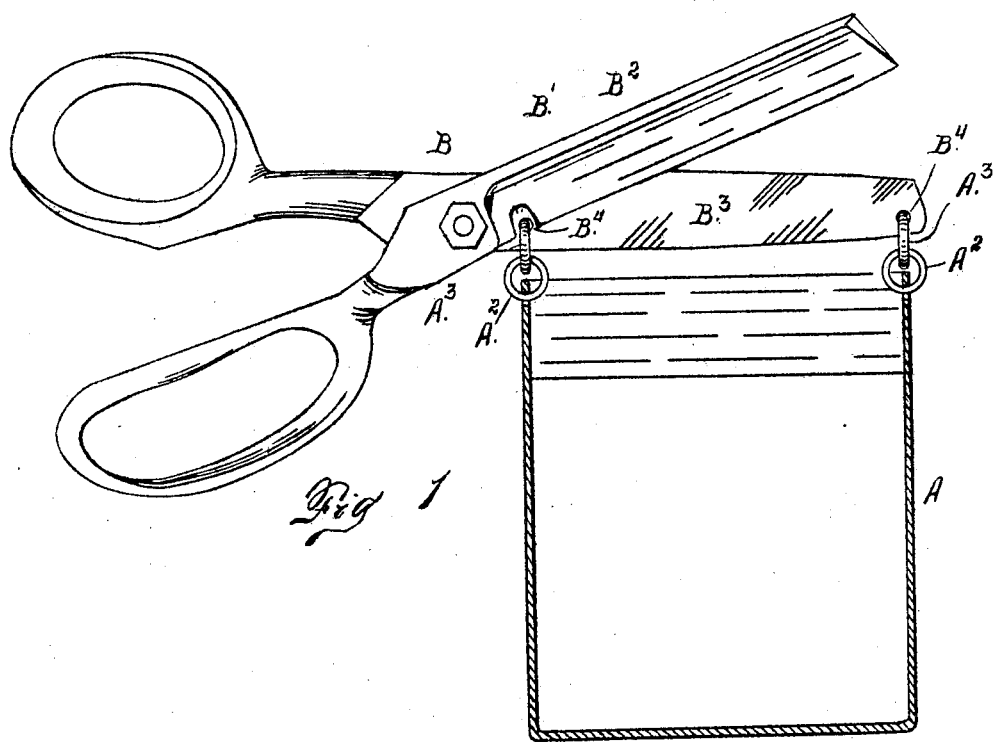

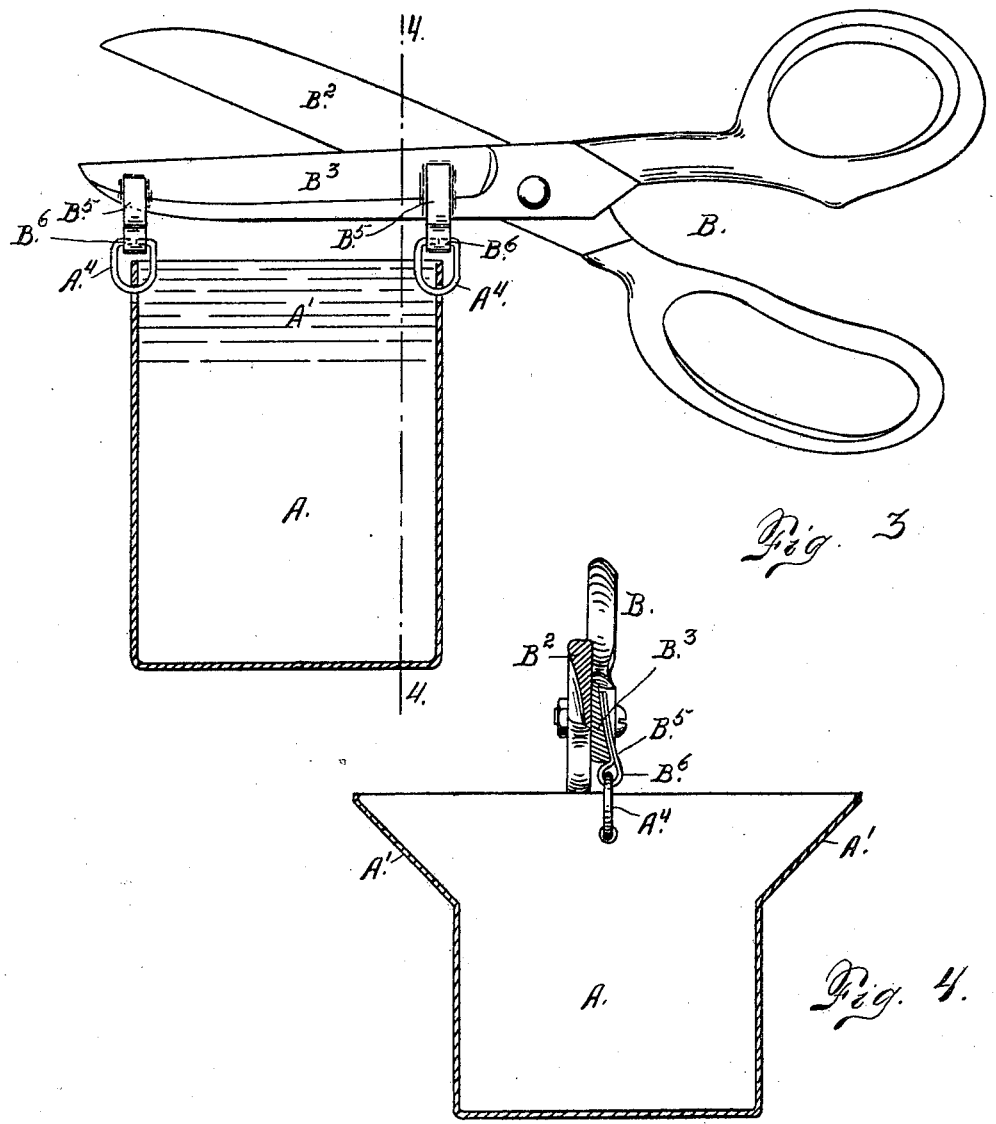

No. 795,151. Patented July 18, 1905.

UNITED STATES PATENT OFFICE.

CLARENCE MONROE AND CASIUS A. COULTER, OF LOVELAND, COLORADO.

FRUIT-PICKER.

SPECIFICATION forming part of Letters Patent No. 795,151, dated July 18, 1905.

Application filed July 25, 1904. Serial No. 218,122.

*To all whom it may concern:*

Be it known that we, CLARENCE MONROE and CASIUS A. COULTER, citizens of the United States, residing at Loveland, in the county of Larimer and State of Colorado, have invented certain new and useful Improvements in Fruit-Pickers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to fruit-picking devices; and it consists of a pair of shears or scissors for severing the stems of the fruit, in combination with a receptacle into which the individual fruit specimens drop as their stems are severed by the cutter, the scissors being connected with the receptacle in the manner hereinafter described and claimed. This device while capable of use in picking fruit generally from trees is more especially intended for use as a cherry-picker. In picking cherries it is desirable that a portion of the stem be left upon each cherry, since the fruit will keep longer than where the stem is pulled out. Moreover, it is not desirable that the full length of the stem should remain. By the use of our improved device any desired portion of the stem may be left upon the fruit.

The device consists, as illustrated in the drawings and hereinafter more specifically described, of a pair of shears or scissors, one blade of which is movably connected with the receptacle on opposite sides, being attached at two distinct points, whereby the position of the scissors may be changed from the vertical to the horizontal or to any position between these two extremes, whereby the stem of the cherry may be cut regardless of the position it occupies. As the stem of the cherry is cut it falls into the receptacle, and after the latter is full it may be emptied and the operation continued. The size of the receptacle should be such that it can be easily supported by the hand holding the scissors until it is filled with fruit. It will of course be understood, however, that the invention is not limited to any special size or construction of fruit-receptacle.

Having briefly outlined our improved construction, we will proceed to describe the same in detail, reference being made to the accompanying drawings, in which is illustrated an embodiment thereof.

Figure 2:
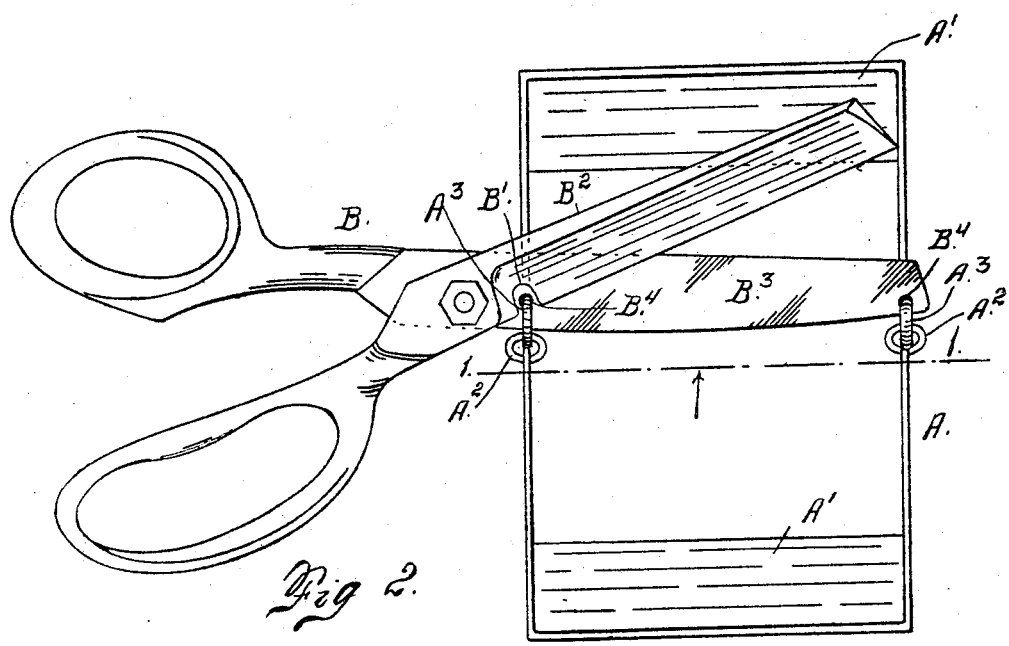

In the drawings, Figure 1 is a side view of our improved device with the receptacle shown in vertical section on the line 1 1, Fig. 2. Fig. 2 is a top view with the scissors in a different relative position from that shown in Fig. 1. Fig. 3 is a view similar to Fig. 1, showing a modified form of construction. Fig. 4 is a section taken on the line 4 4, Fig. 3.

The same reference characters indicate the same parts in all the views.

Referring more especially to Figs. 1 and 2, let A designate the receptacle, which, as shown in the drawings, is enlarged at the top and provided with inclines $A'$, forming a hopper-shaped mouth. To the top of this device, which may be composed of sheet metal, rings $A^2$ are attached on opposite sides. Other rings $A^3$ are connected with the rings $A^2$. These rings $A^3$ pass through orifices $B^4$, formed in a blade $B^3$ of a pair of scissors B. The orifices $B^4$ may be of such size that the ring is allowed to move freely in the orifices. In any event the scissors may be turned from the vertical to the horizontal position in either direction, whereby they may be adjusted to correspond with the position of the stem of the cherry which it is desired to sever. The blade $B^2$ of the scissors is provided with a notch $B'$, which one of the rings $A^3$ is adapted to enter when the blades are in the closed position.

In Figs. 3 and 4 a slightly-modified form of construction is illustrated. In the opposite upper edges of the receptacle are inserted loops $A^4$, with which are connected clips $B^5$, which, as shown in the drawings, are doubled and secured to one blade of the shears or scissors by brazing. The lower extremity of each clip is formed into an eye $B^6$, through which the loop $A^4$ passes. By virtue of this construction the scissors may be turned in either direction and may be made to assume any angle between the vertical and horizontal as circumstances may require when the device is in use. This construction obviates the necessity of forming a recess in the scissors-blade $B^2$, since the clips $B^5$ are attached to one side only of the blade $B^3$. This construction also obviates the necessity of drilling holes in the blade $B^3$. In any event it will be understood that the invention is of sufficient scope to cover both forms as well as any other suitable manner of connecting the shears or scissors with the receptacle in such a manner that the shears may be manipulated as is required in the proper performance of the function of a device of this character.

In using the device the receptacle is supported by the scissors-blade $B^3$. The scissors are taken in the hand of the user, who reaches into or through the branches of the tree and cuts the stems of the cherries or other fruit which it is desired to pick. As the stems are clipped the fruit falls into the receptacle. This may be continued until the receptacle is full. It may then be emptied and the operation continued at will.

Having thus described our invention, what we claim is—

1. The combination of a suitable receptacle, a pair of scissors, and rings connecting one blade of the scissors with the receptacle on opposite sides.

2. In a fruit-picker, the combination of a receptacle, rings connected with the upper edge of the receptacle on opposite sides, a pair of scissors or shears provided with orifices, and other rings passing through the orifices of the shears and interlocking with the first-named rings.

3. The combination of a receptacle, a pair of scissors, and rings connecting one blade of the scissors with the receptacle on opposite sides of the latter, the other blade of the scissors being provided with a notch or recess for one of the rings to enter to permit the scissors-blades to assume the closed position, substantially as described.

In testimony whereof we affix our signatures in presence of two witnesses.

CLARENCE MONROE.
CASIUS A. COULTER.

Witnesses:
J. B. KEMPTON,
U. O. CHAMBERS.